United States Patent [19]

Brosig et al.

[11] Patent Number: 5,172,255

[45] Date of Patent: Dec. 15, 1992

[54] PROCESS FOR INCREASING PRETILT ANGLES IN NEMATIC LIQUID CRYSTAL CELLS

[75] Inventors: Stefan Brosig, Stuttgart; Hansjorg Wirsig, Kornwestheim, both of Fed. Rep. of Germany

[73] Assignee: NOKIA Unterhaltungselektronik (Deutschland) GmbH, Fed. Rep. of Germany

[21] Appl. No.: 871,574

[22] Filed: Apr. 20, 1992

Related U.S. Application Data

[63] Continuation of Ser. No. 592,199, Oct. 3, 1990.

[30] Foreign Application Priority Data

Oct. 6, 1989 [DE] Fed. Rep. of Germany ....... 3933422

[51] Int. Cl.$^5$ ........................................... G02F 1/1337
[52] U.S. Cl. ........................................ 359/76; 359/78; 427/162; 427/355; 427/444; 428/1
[58] Field of Search ................... 427/162, 355, 444; 428/1; 359/76, 78; 29/592.1

[56] References Cited

U.S. PATENT DOCUMENTS

4,207,671  6/1980  Gharadjedaghi et al. .......... 29/592.1

FOREIGN PATENT DOCUMENTS

| 62-36634 | 2/1987 | Japan | 427/355 |
| 63-30828 | 2/1988 | Japan | 427/355 |
| 63-96632 | 4/1988 | Japan | 427/355 |
| 1-55527 | 3/1989 | Japan | 427/355 |
| 1-55528 | 3/1989 | Japan | 427/355 |

OTHER PUBLICATIONS

Molecular Crystals and Liquid Crystals, 132, NR½ 1986, New York, US, pp. 167-180, M. E. Becker et al. entitled: "Alignment Properties of Rubbed Polymer Surfaces".

Patent Abstracts of Japan, vol. 13, NR 261 (P-885) (3609) Jun. 16, 1989, entitled "Production of Liquid Crystal".

Proceedings of the Society of Information Display, vol. 28, NR 20 1987, Los Angeles, US, pp. 155-158, K. Yoshida et al., entitled: "Genovation of a High Pretilt Angle by Rubbing: Application to Supertwisted Nematic LCDs".

JP Patents Abstracts of Japan: 63 208825 A, P-807, Dec. 27, 1988, vol. 12, No. 499.

JP Patents Abstracts of Japan: 63 199320 A, P-802, Dec. 16, 1988, vol. 12, No. 483.

JP Patents Abstracts of Japan: 63 66534 A, P-742, Aug. 9, 1988, vol. 12, No. 290.

JP Patents Abstracts of Japan: 63 64027 A, P-741, Aug. 8, 1988, vol. 12, No. 288.

JP Patents Abstracts of Japan: 63 30827 A, P-726, Jul. 7, 1988, vol. 12, No. 238.

JP Patents Abstracts of Japan: 62 295026 A, P-711, Jun. 2, 1988, vol. 12, No. 188.

JP Patents Abstracts of Japan: 62 215925 A, P-675, Mar. 10, 1988, vol. 12, No. 76.

JP Patents Abstracts of Japan: 62 189429 A, P-663, Feb. 6, 1988, vol. 12, No. 42.

JP Patents Abstracts of Japan: 61 250616 A, P-561, Mar. 28, 1987, vol. 11, No. 100.

JP Patents Abstracts of Japan: 61 32816 A, P-473, Jul. 3, 1986, vol. 10, No. 188.

JP Patents Abstracts of Japan: 60 32024 A, P-368, Jun. 29, 1985, vol. 9, No. 156.

JP Patents Abstracts of Japan: 59 187321 A, P-338, Feb. 28, 1985, vol. 9, No. 48.

Primary Examiner—Shrive Beck
Assistant Examiner—Terry J. Owens
Attorney, Agent, or Firm—Ware, Fressola, Van Der Sluys & Adolphson

[57] ABSTRACT

In a process for treating an organic orientation layer on a substrate plate for a liquid crystal cell, the orientation layer for causing the orientation is rubbed in the conventional way in a specified direction. Rubbing is then performed in the opposite direction, but with a weaker rubbing pressure. Rubbing in the opposite direction with weak pressure leads to an increase of some degrees in the pretilt angle, and this is essentially independent of the material used for the orientation layer.

6 Claims, No Drawings

PROCESS FOR INCREASING PRETILT ANGLES IN NEMATIC LIQUID CRYSTAL CELLS

This is a continuation of copending application(s) Ser. No. 07/592199 filed on Oct. 3, 1990, now abandoned.

BACKGROUND OF THE INVENTION

1. Field of the Invention

The invention relates to a process for producing a liquid crystal cell, or more precisely, a process for treating an organic orientation layer on a substrate plate for a liquid crystal cell.

2. Description of the Prior Art

Orientation layers of the type mentioned above serve to generate an orientation and a pretilt of the liquid crystal molecules. The term 'orientation' is here taken to mean the angle between the edge of a substrate plate and the projection of a liquid crystal molecule onto this substrate plate. The pretilt is the angle by which a liquid crystal molecule is tilted against the plane of the substrate plate.

Orientation layers of the type mentioned are produced with two different material groups using two different processes. One process utilizes inorganic materials which are vacuum-deposited slantwise onto the substrate plate in the direction of orientation. The second process utilizes organic substances which, for example, are applied by spraying, immersion or (as a rule) by spincoating. The polymer films are subjected to a tempering process, and then rubbed with a soft material (generally velvet) affixed to a roller. This rubbing is performed in the desired direction of orientation.

It is known from DE 27 22 389 A1, which corresponds to U. S. Pat. No. 4,207,671, which is incorporated herein by reference, that for orientation and pretilt setting both processes are used jointly, i.e., both slantwise deposition and rubbing. The rubbing is performed several times in a specified direction. The direction specified will, when a steep deposition angle has been used, stand at right angles to the projection of the deposition direction onto the substrate plate. In the case of flat deposition angles, rubbing is performed parallel to the projection of the deposition direction onto the substrate plate, from the side on which due to the slantwise deposition the liquid crystal molecules lie deeper in the finished liquid crystal cell, i.e., in the direction of rising pretilt, so to speak. This process permits the pretilt (which is also relatively steep with flat slantwise deposition) to be set to smaller values.

While when using slantwise-deposited inorganic orientation layers there tend to be problems with the finished liquid crystal cells due to excessively high pretilt angles, the situation is rather the opposite when polymer rubbed orientation layers are used. Efforts have been made in this context to achieve higher pretilt angles by developing the materials used. Attempts have also been made not to rub the materials, but instead to cause an orientation of the polymer orientation-layer molecules by pouring these on in the orientation direction or by means of other flowapplication processes. It seemed desirable to avoid the rubbing, since it was known that rubbing reduces the originally-attainable high pretilt angles (see in this context the findings of U.S. Pat. No. 4,207,671 cited above).

All attempts so far made to develop better materials for orientation layers and to improve production methods for such layers have not yet led to fully satisfactory results, i.e., to polymer orientation layers with which very high pretilt angles can be simply and reliably achieved.

SUMMARY OF THE INVENTION

The process described in the invention for treating a polymer orientation layer is distinguished by the fact that first rubbing is performed in the conventional way in one direction one or more times. Then, however, rubbing is performed in the opposite direction but with a weaker application pressure. This rubbing in the opposite direction can also be repeated several times.

It has been shown that with this process the pretilt angles of all organic orientation layers can be increased by some degrees, irrespective of the material used. The increase in pretilt by some degrees is thus achieved both with conventional polyimide orientation layers (which conventionally exhibit a pretilt of only a few degrees) and with more recently developed materials, e.g., polyphenylene or more recent polyimides, with which under the conventional production processes pretilt angles of about 15°-20° are achieved.

DETAILED DESCRIPTION OF THE INVENTION

Trials have been performed both with conventional polyimide and with known polyphenylene layers. The polyimide used was obtained from Messrs. Merck, Federal Republic of Germany, and the polyphenylene used from Messrs. ICI, Great Britain. Using a customary spincoating process, these materials were applied to substrate plates made of glass, and tempered in the usual way. The subsequent rubbing in a specified orientation direction, too, was performed in the conventional way, i.e., with the customary rubbing speed and customary rubbing pressure. A velvet-covered roller was used, the length of the velvet hairs being about 2 mm. It must be noted that up to this point in the production process there is no difference from the customary process already known.

It should be understood that the rubbing force depends upon the material of the rubbing roller (i.e., velvet or felt, and the hardness of resilient material beneath the velvet or felt) and the distance between the roller axis and the orientation layer. Conventionally, a comparably high rubbing force is required for a polyphenylene layer and a low rubbing force for a polyimide layer.

Then, however, the layers were rubbed in the opposite direction, using the same velvet roller and the same rubbing speed, but with a reduced rubbing force. The roller was moved only near enough to the orientation layer for the velvet hairs just to touch down on the layer. During rubbing in the original direction, contrariwise, the distance between orientation layer and roller was about ¼-½mm less, so that the velvet hairs (about 2 mm in length) were considerably bent. Thus, the rubbing force in the opposite direction was less than one-fourth of the force used for the conventional rubbing in the first direction. Preferably, the rubbing force in the opposite direction should be about one-twentieth to one-tenth of the conventional force.

It has emerged that it is of advantage to rub several times with a weak pressure. Probably, when the pressure applied is weak, there are, statistically speaking, relatively large differences in treatment in the different areas, which differences are equalized by repeated rubbing.

There is no certain explanation for the effect observed, neither is there a substantiated explanation for the effects of pretilt and orientation generation. Observations made on slantwise-deposited inorganic layers indicate that the pretilt is determined not only by chemical-physical properties, but also by mechanical properties of the layer, namely by a corrugated structure. If such a corrugated structure is likewise generated with the customary relatively strong rubbing of a polymer orientation layer, it can be imagined that the weak rubbing in the opposite direction leads to the crests of the corrugations being pushed somewhat backwards and therefore increased in height. This would render it plausible that the weak rubbing in the opposite direction causes an increase in pretilt.

Just as customarily the optimum rubbing pressure, the optimum rubbing speed and the optimum rubbing material have to be found for every orientation-layer material used and every concrete production sequence, it is also necessary in the process described here to ascertain experimentally in each individual case how the process variables must be selected for the rubbing in the opposite direction in order to achieve optimum increase in pretilt. It has, however, emerged that here optimization is considerably simpler than is the case with optimization of conventional rubbing, since the optimization process for the rubbing in the opposite direction follows on the conventional optimization process for the customary rubbing, so that the rubbing material (usually a velvet-covered roller) and the rubbing speed are already essentially settled, and only the rubbing pressure remains to be optimized.

In the experiments described, no equipment for precise measurement of the pretilt was available. The increase in the pretilt was, however, in the case of twisted nematic liquid crystal cells easily recognizable between crossed polarizers by the lesser brightness of the cells treated in comparison to the untreated cells. The higher the pretilt, the stronger is the component of polarized light, whose vector is not twisted by the twisted nematic cell; this non-twisted component is cancelled by the crossed second polarizer. The effect of decreasing brightness was equally evident both when using polyimide for the orientation layer and also when using polyphenylene. In the conventional production method, the pretilt when using conventional polyimide measures about 1°-5° while the pretilt when using polyphenylene measures about 10°-20° depending on how elaborately the process is conducted. The increase in pretilt generated by light rubbing in the opposite direction is estimated (in view of the brightness reduction observed) as a few degrees, and probably measures about 3°-6°.

What is claimed is:

1. In a process for producing a nematic liquid crystal cell in which a substrate plate for the nematic liquid crystal cell is provided with an organic orientation layer for generating an orientation and a pretilt of the nematic liquid crystal molecules, said organic orientation layer is treated using conventional rubbing, in a specified direction to achieve a conventional orientation effect, with a rubbing force depending upon the material of the orientation layer and the rubbing material, the improvement comprising the step of rubbing the orientation layer in a direction opposite to the specified direction with a rubbing force less than one-fourth of the rubbing force used for the conventional rubbing in the specified direction, whereby pretilt angles are increased.

2. A process as described in claim 1, wherein the orientation layer is rubbed several times in the opposite direction with said rubbing force less than one-fourth of the rubbing force used for conventional rubbing.

3. A process as described in claim 1, wherein the rubbing force, when rubbing in the opposite direction, is about one-tenth of the rubbing force used for the conventional rubbing in the specified direction.

4. A process as described in claim 2, wherein the rubbing force, when rubbing in the opposite direction, is about one-tenth of the rubbing force used for the conventional rubbing in the specified direction.

5. A process as described in claim 1, wherein the rubbing force, when rubbing in the opposite direction, is in a range of one-tenth to one-twentieth of the rubbing force used for the conventional rubbing in the specified direction.

6. A process as described in claim 2, wherein the rubbing force, when rubbing in the opposite direction, is in the range of one-tenth to one-twentieth of the rubbing force used for the conventional rubbing in the specified direction.

* * * * *